United States Patent [19]
Gruntfest et al.

[11] 3,937,675
[45] Feb. 10, 1976

[54] TREATMENT OF TEXTILE WASTE FORMED OF POLYESTER AND CELLULOSIC FIBERS

[75] Inventors: Irving Gruntfest, Cheltenham, Pa.; Rudolph Turner, Trenton, N.J.

[73] Assignee: Textile Research Institute, Princeton, N.J.

[22] Filed: Nov. 18, 1974

[21] Appl. No.: 524,591

[52] U.S. Cl. ................................................. 260/2.3
[51] Int. Cl.² ......................................... C08J 11/04
[58] Field of Search ..................................... 260/2.3

[56] References Cited
UNITED STATES PATENTS

| | | | |
|---|---|---|---|
| 2,498,398 | 2/1950 | Dasher | 260/2.3 X |
| 2,567,802 | 9/1951 | Carr et al. | 260/2.3 X |
| 2,701,268 | 2/1955 | Dasher | 260/2.3 X |

OTHER PUBLICATIONS
Ott et al., – (Text Book) Cellulose Part II – 4/1955 – pp. 778–779.

*Primary Examiner*—Carman J. Seccuro
*Attorney, Agent, or Firm*—Sperry and Zoda

[57] ABSTRACT

Textile wastes formed of blended cellulose and polyester fibers are treated with a mineral acid agent, such as sulfuric acid, under conditions which serve to hydrolyze the cellulose and convert it to a form which is readily removed from the polyester fibers while leaving the polyester fiber substantially unaffected. The cellulosic material is recovered in the form of "fibrets" adapted for use as such or for treatment in producing other cellulosic compounds whereas the polyester fiber recovered may be garnetted for reuse in either spun yarn manufacture or in nonwoven processes.

8 Claims, No Drawings

TREATMENT OF TEXTILE WASTE FORMED OF POLYESTER AND CELLULOSIC FIBERS

FIELD OF INVENTION

Large quantities of textile wastes consisting of blended polyester and cellulosic fibers such as cotton, rayon and the like, are produced in the manufacture of clothing and other textile products. The direct reuse of such blends is inhibited by the variability of their composition which makes the generation of a commercially acceptable by-product difficult or impossible with the result that most of such waste is discarded or converted into wiping cloths or scrap of very little value. Moreover, much of the textile waste is derived from fabrics which have been treated with resinous material or finishing compositions which render them difficult to process.

In accordance with the present invention, textile waste containing blended polyester and cotton or rayon fibers are treated to recover such materials in useful form. For this purpose, the waste material is subjected to the action of a mineral acid under conditions which serve to react with the cellulosic component to convert it into a product which is readily separated from the polyester fibers while leaving the polyester fibers in an unreacted condition. In some instances, the waste is given a preliminary acid treatment to remove resinous or other finishing material therefrom.

PREFERRED EMBODIMENTS

In accordance with the present invention, the textile waste is immersed in a mineral acid such as sulfuric acid whereby the cellulosic component thereof is hydrolyzed and converted to a form which may be readily washed out or removed from the unreacted polyester fibers. When resinous material is to be removed from the fibers, they are preferably first treated with a dilute solution of sulfuric acid to dissolve or decompose the resinous material which is washed out of the waste.

The reactions employed for converting the cellulosic constituent to a condition permitting ready separation thereof from the polyester may be carried out in various ways. Thus, treatment with an aqueous solution containing from 5% to 10% of sulfuric acid at a temperature of about 80°C to 100°C for a period of from 15 to 60 minutes will serve to convert the cellulosic fiber to a fragile fiber which may be separated from the unaffected polyester component by a simple washing process. The resulting short cellulosic fibers referred to as "fibrets", may be used as a filtering medium, filler material and for other purposes, whereas the polyester component may be garnetted to staple fiber and recovered for reuse in traditional yarn spinning operations or in forming bats for quilting, needle-punching and other nonwoven structures.

In general, the process of the present invention is carried out in three steps consisting of a first acid treatment which not only decomposes and dissolves any resinous materials present but also converts the cellulose to a hydrolyzed and short fibered condition. This step is followed by a second step wherein the acid treated fabric is subjected to an agitated washing process which serves to separate the resulting short, cellulosic fibrets from the undamaged but opened up polyester yarns in a form permitting them to be recovered by filtration or sedimentation for reuse. The third step involves garnetting of the loosened but undamaged polyester yarns to convert them to fiber form suitable for reuse or reworking in a conventional manner.

The conditions serving to convert the cellulose to a short fibered condition after treatment with sulfuric acid at 100°C are illustrated by the following table:

| Acid Concentration (wt. %) | 5 | 10 | 15 | 20 | 25 | 30 | 35 |
|---|---|---|---|---|---|---|---|
| Time to appearance of short fiber (min) | 45 | 30 | 13 | 10 | 4 | 3 | 2 |
| Total treatment time (min) | 45 | 45 | 30 | 30 | 30 | 30 | 30 |
| % Recovery | 99.5 | 89.4 | 86.8 | 93 | 83 | 75.2 | 24.1 |

The role of the acid in this step of the process is primarily catalytic so that the only real acid consumption is apparently due to the reaction with small amounts of resin present on the fabric treated.

In order to illustrate typical procedures embodying the present invention the following examples are cited.

EXAMPLE I

Nonresin-treated white sheeting in the form of a blend of equal parts of cotton and polyester having a weight of 4 ounces per square yard, was converted to the form of pieces one inch square. 5 parts by weight of this waste were then immersed in 15 parts by weight of a 10% solution of sulfuric acid and maintained at a temperature of 80°C for 1 hour. The material was then subjected to agitated aqueous washing at room temperature for a period of 15 minutes. The weakened cotton fibers were thereby broken into short lengths and dispersed in the water in the form of a dilute, dispersion whereas the polyester yarns of the waste were unaffected and were quite open and sheer.

The dispersion was filtered and the cotton was recovered in a highly crystalline form of hydrocellulose with a degree of polymerization determined by viscosity measurements of approximately 100. Dimensionally the fibrets range in length from several microns to several millimeters and they have the typical diameters of cotton fibers.

The polyester material separated from the cotton was washed with water and dried and was then garnetted with the result that essentially undamaged polyester fibers adapted for reuse in spun yarn manufacture or in nonwoven processes were recovered.

EXAMPLE II

Dark colored resin-treated fabric having a weight of 9 ounces per square yard and consisting of a blend of equal parts of cotton and polyester was cut into pieces 1 inch square for use. 5 parts by weight of this material was immersed in 15 parts of a 5% solution of sulfuric acid held at a temperature of 100°C for 30 minutes after which the acid was decanted and the material subjected to vigorous agitation in water at room temperature for 30 minutes.

The cotton dispersion produced was filtered to recover the resulting fibrets whereas the unaffected polyester was garnetted to produce a staple fiber for reuse.

The dispersion of the cotton fibrets produced may be concentrated by evaporation to form a slurry and freeze dried or otherwise treated to obtain a product which without further conversion is adapted for use as a constituent of oil well drilling muds, binders in ceramics, additives and coatings for paper and as starting materials for the formation of cellulose derivatives.

Only about 5% of cotton is lost in the process whereas the acid liquor and the wash liquor can be reused so as to materially reduce the cost of the operation.

The concentration of the acid and the temperature and time of treatment of the waste material as well as the duration of the agitation or washing to separate the cotton fibrets from the polyester can be varied considerably. Furthermore if desired other mineral acid reagents such as hydrochloric acid, phosphoric acid, sodium acid sulfate and the like may also be used in carrying out the process.

The textile waste material used may be either woven or knitted in character although when knitted materials are subjected to wet mechanical action, there is some tendency for the polyester fibers to become frayed with resultant contamination of the cellulose.

While the treatment of textile wastes described above has been exemplified by typical examples in the foregoing description, it should be understood that the procedure can be carried out in various ways and using other conditions, concentrations and reagents. It is, therefore, intended that the particular examples cited are to be considered as illustrative only.

We claim:

1. A method for recovering polyester fibers and cellulosic material in useful form from textile wastes containing the same which comprises the steps of treating the waste with an aqueous solution of a mineral acid under reaction conditions which serve to convert the cellulose to a substantially non-fibrous condition while leaving the polyester fibers substantially unaffected, separating the liquid and cellulosic reaction product from the polyester fibers and thereafter separating said reaction product from said liquid.

2. A method as defined in claim 1 wherein the mineral acid is sulfuric acid.

3. A method as defined in claim 1 wherein the mineral acid is in the form of an aqueous solution containing at least 5% and not more than about 35% by weight of sulfuric acid.

4. A method as defined in claim 3 wherein said reaction is carried out at a temperature of from about 80°C to 100°C.

5. A method of recovering polyester fibers and cellulosic material in useful form from textile wastes containing the same which comprises immersing said waste in an aqueous solution containing from about 5% to 35% by weight of sulfuric acid, agitating said solution and waste for a period of from about 15 minutes to one hour at a temperature of from about 80°C to 100°C, separating the polyester fiber from said solution, and thereafter separating the resulting cellulosic reaction product from said solution.

6. A method as defined in claim 5 wherein the polyester fiber is washed with water to separate the cellulosic reaction product therefrom and the polyester fiber is thereafter garnetted.

7. A method as defined in claim 5 wherein the cellulosic reaction product is separated from the polyester fibers by washing the fiber with a liquid and is recovered from the resulting wash liquid.

8. A method as defined in claim 7 wherein the wash liquid is concentrated and thereafter freeze dried to obtain the cellulosic reaction product therefrom.

* * * * *